United States Patent

Brewer et al.

[11] Patent Number: 5,939,246
[45] Date of Patent: Aug. 17, 1999

[54] COLOR PHOTOGRAPHIC SILVER HALIDE NEGATIVE IMAGING MATERIAL AND PROCESS

[75] Inventors: John C. Brewer, Rochester; Donald H. Hunger, Hilton, both of N.Y.

[73] Assignee: Eastman Kodak Company, Rochester, N.Y.

[21] Appl. No.: 09/007,856

[22] Filed: Jan. 15, 1998

Related U.S. Application Data

[60] Provisional application No. 60/039,195, Mar. 17, 1997.

[51] Int. Cl.$^6$ .................................................. G03C 1/40
[52] U.S. Cl. .................. 430/606; 430/359; 430/390; 430/505; 430/544; 430/559; 430/957
[58] Field of Search ............................. 430/505, 544, 430/606, 957, 559

[56] References Cited

U.S. PATENT DOCUMENTS

| | | | |
|---|---|---|---|
| 4,312,941 | 1/1982 | Scharf et al. | 430/510 |
| 4,391,884 | 7/1983 | Meyer et al. | 430/17 |
| 4,439,520 | 3/1984 | Kofron et al. | 430/434 |
| 4,678,740 | 7/1987 | Catania | 430/356 |
| 4,740,454 | 4/1988 | Deguchi et al. | 430/454 |
| 4,746,600 | 5/1988 | Watanabe et al. | 430/505 |
| 4,833,069 | 5/1989 | Hamada et al. | 430/496 |
| 4,855,220 | 8/1989 | Szajewski | 430/505 |
| 4,956,269 | 9/1990 | Ikeda et al. | 430/505 |
| 5,283,164 | 2/1994 | Fenton et al. | 430/506 |
| 5,308,747 | 5/1994 | Szajewski et al. | 430/507 |
| 5,395,744 | 3/1995 | Sowinski et al. | 430/505 |
| 5,399,469 | 3/1995 | Szajewski | 430/506 |

FOREIGN PATENT DOCUMENTS

| | | |
|---|---|---|
| 0 566 077 A2 | 10/1993 | European Pat. Off. . |
| 0 680 205 A2 | 11/1995 | European Pat. Off. . |
| 94/24830 | 10/1994 | WIPO . |

OTHER PUBLICATIONS

*Research Disclosure*, No. 37038, Feb. 1995.

*Research Disclosure*, No. 25330, May 1985.

"Bluescreen/Greenscreen 101" by Christopher Probst, *American* Cinematographer, Dec. 1996, pp. 91–98.

*Primary Examiner*—Hoa Van Le
*Attorney, Agent, or Firm*—Andrew J. Anderson

[57] ABSTRACT

A process of compositing two or more separate images comprising: (a) imagewise exposing a color negative photographic recording material to a subject in front of a uniformly colored screen background, wherein the photographic recording material comprises a support bearing red light, green light, and blue light sensitive color records, and at least one distributed red light absorbing compound in an amount such as to reduce the sensitivity of the red light sensitive color record by at least 40%, and the light sensitivities of the green light sensitive color record and the blue light sensitive color record are each reduced by less than 20% by the presence of any distributed light absorbing compounds, (b) forming a color negative image of the subject and screen background by developing the exposed photographic material with a color developing agent, (c) separating the subject image of the color negative from the screen background image, and (d) compositing the separated subject image with a second image. Photographic elements for use in such process are also disclosed. The invention eliminates or substantially reduces red record fringe problems without significantly effecting granularity in the blue and green color records.

25 Claims, No Drawings

COLOR PHOTOGRAPHIC SILVER HALIDE NEGATIVE IMAGING MATERIAL AND PROCESS

This application claims benefit of Provisional Appl. 60/0395,195, filed Mar. 17,1997.

FIELD OF THE INVENTION

This invention relates to photographic materials and processes, and more specifically to color photographic silver halide negative recording materials optimized for use in color difference screen matte photography applications.

BACKGROUND ART

Desirable properties for photographic silver halide recording material include high sensitivity (i.e., speed), low granularity, and high sharpness. With respect to sharpness, the recording material should enable faithful reproduction and display of both coarse and fine details of the original scene. This combination of sharpness performance has proven difficult to achieve in practice, especially in combination with high sensitivity and low granularity. A general description of the nature of this problem may be found in T. H. James, Ed., "The Theory of the Photographic Process," Macmillan, New York, 1977 and, in particular, at Chapter 20 of this text, pages 578–591, entitled "Optical Properties of the Photographic Emulsion" by J. Gasper and J. J. DePalma.

One method of improving sharpness, disclosed at U.S. Pat. No. 4,312,941 and at U.S. Pat. No. 4,391,884, involves the incorporation of a spatially fixed absorber dye in a film layer between the exposing light source and a layer comprising a conventional grain light sensitive silver halide emulsion. In these disclosures, the absorber dye is held spatially fixed either by means of a ballast group or by means of a mordanting material incorporated at a specified position in the film structure. Use of this spatial arrangement of absorber dye and emulsion reduces front-surface halation effects and improves sharpness, but at the expense of grain and speed.

U.S. Pat. No. 4,439,520, inter alia, discloses the utility of sensitized high aspect ratio silver halide emulsions for use in light sensitive materials and processes. These high aspect ratio silver halide emulsions, herein known as tabular grain emulsions, differ from conventional grain emulsions in many characteristics. One differential characteristic is the relationship between the emulsion grain thickness and the emulsion grain equivalent circular diameter. Conventional grain emulsions tend to be isotropic in shape and, when incorporated in a film structure, tend to be randomly oriented within a particular layer. Tabular grain emulsions however, tend to be anisotropic in shape and, when incorporated in a film structure, tend to align such that their major axis parallels the plane of the film base. This degree of anisotropicity is know as the emulsion aspect ratio (AR), typically defined as the ratio of the emulsion grain equivalent circular diameter divided by the emulsion grain thickness. The ability to control emulsion grain thickness and alignment within a film structure can enable the realization of otherwise unattainable degrees of recording material performance.

The optical properties of photographic recording materials incorporating tabular grain emulsions are described in great detail at "Research Disclosure", No. 25330, May, 1985, as are methodologies of specifying particular arrangements of tabular grain emulsions within a film structure and of specifying particular tabular grain emulsion thicknesses so as to enable the attainment of specifically desired properties, such as speed or sharpness in underlying or overlying emulsion layers.

These methods may not prove to be wholly satisfactory. U.S. Pat. No. 4,740,454, for example, discloses that although high frequency sharpness may be attained by the appropriate choice of tabular grain emulsion thickness and placement, this can be at the cost of low frequency sharpness. The term "high frequency sharpness" generally relates to the appearance of fine detail in a scene reproduction, while the term "low frequency sharpness" generally relates to the appearance of clarity or "snap" in scene reproduction. It is understood that the terms "high frequency sharpness" and "low frequency sharpness" are qualitative in nature and that both image spatial frequency, expressed as cycles/mm in the film plane, and the image magnification employed in producing a reproduction must be taken into account when specifying such terms. This publication discloses that both high frequency and low frequency sharpness may be simultaneously improved by the incorporation of specific mercaptothiadiazole compounds in combination with tabular grain silver halide emulsions. This practice may not be wholly satisfactory since the incorporation of such silver ion ligands can lead to deleterious effects on film speed and film keeping properties.

In related areas, U.S. Pat. Nos. 4,746,600 and 4,855,220 disclose that large degrees of sharpness can be attained by combining spatially fixed absorber dyes and Development Inhibitor Releasing Compounds (DIR Compounds) in a photographic silver halide recording material. The spatially fixed absorber dye is positioned between an emulsion containing layer and the exposing light source. The materials described in these disclosures incorporate either conventional grain silver halide emulsions or low aspect ratio tabular grain silver halide emulsions. U.S. Pat. No. 5,308,747 discloses that the use of positioned absorber dyes in a layer between an exposing source and a layer comprising high aspect ratio tabular grain silver halide emulsions results in even larger sharpness improvements. U.S. Pat. No. 5,399,469 discloses that the use of spatially fixed absorber dyes in a less sensitive layer positioned below a more sensitive layer sensitized to the same region of the electromagnetic spectrum which is closer to an exposure source provides improved image sharpness without compromising photographic sensitivity.

In a further related area, U.S. Pat. No. 4,833,069 discloses that large degrees of sharpness can be attained by simultaneously controlling total imaging layer thickness to between 5 and 18 microns and incorporating large quantities, between 15 and 80 mol % of colored cyan dye-forming couplers, known also in the art as cyan dye-forming color masking couplers. This method may not be wholly satisfactory since the use of excessive quantities of color masking couplers can lead to inferior color rendition by over-correcting the color reproduction through excessive use of the masking function.

In yet another related area, U.S. Pat. No. 4,956,269 discloses that color reversal silver halide photographic materials incorporating tabular grain silver halide emulsions can show improved sharpness when the red and/or green sensitive layers of the material incorporates a quantity of absorber dye sufficient to reduce the speed of that layer by at least 20%, when the total imaging layer thickness is less than 16 microns and when the swell ratio of the film is greater than 1.25. The materials described in this disclosure incorporate intermediate aspect ratio (AR<9.0) tabular grain silver halide emulsions. U.S. Pat. No. 5,395,744 discloses that the use of distributed absorber dyes in a color photographic negative material comprising high aspect ratio tabular grain silver halide emulsions and development inhibitor releasing couplers results in even larger sharpness improvements. U.S. Pat. No. 5,283,164 discloses the use of sufficient red absorbing dye in a color negative duplicating film comprising fine grain silver halide emulsion to closely match the acutance of the red and green color records.

Color negative silver halide photographic recording materials incorporating quantities of distributed dye sufficient to reduce the speed of each color record by about 50% have been commercially available for many years. Additionally, it has been common practice in the photographic art to commercially provide silver halide photographic recording materials incorporating conventional grain and/or tabular grain silver halide emulsions in combination with soluble dyes sufficient to reduce the speed of a color record by about 10% for purposes related to ease of manufacture. Likewise, color negative silver halide photographic materials incorporating high aspect ratio tabular grain silver halide emulsion with an average grain thickness of circa 0.11 and 0.14 microns in an intermediately positioned layer have been commercially available for many years.

Color difference screen matte photography has long been used in the special effects community for compositing two or more separate images. In such procedures, a subject is typically photographed on color negative film in front of a uniformly colored background screen, the photographic subject image is separated from the uniform background based upon color difference, and the subject image is then superimposed, or composited, with a desired background scene. The procedure may be repeated to composite multiple subject images in a single scene. The majority of this compositing work is now done by first digitizing the color negative film images on commercial film scanners and subsequently applying software algorithms to separate the principal subject from the uniformly colored (e.g., blue or green) matte background (for example, see "Blue Screen/Green Screen 101", American Cinematographer, December 1996, pp. 91–98). The separated subject image information may then be digitally composited with a desired background scene.

Blue screen and green screen backgrounds are most commonly used for color difference screen matte photography. Use of such blue screen and green screen backgrounds (as well as black screen backgrounds which also provide little red light exposure) with conventional color negative films, however, has been hampered by a particular deficiency in the resulting processed film original images, namely the existence of a pronounced cyan dye fringe observed in the red color record of the color negative film around the border between the foreground objects and the matte background which is not easily removed with digital software algorithms. Images exhibiting such fringe artifact which are to be digitized for compositing work accordingly must have the fringe removed painstakingly by rotoscoping techniques. Such red color record fringe problem has been found to appear in films which otherwise exhibit good red record image sharpness or acutance (e.g., relatively high conventional red Modulation Transfer Function, or MTF values measured using 60% or lower input modulation) for conventional scene (i.e., non-blue screen, green screen, or black screen) exposures. As such, conventional MTF values have been found to be an inadequate predictor of a films propensity to exhibit the red fringe problem.

Photographers and cinematographers generally desire the noise level in their images to be as low as possible. To minimize image noise in color negative films, cinematographers strive to use the slowest, finest grain stocks that lighting conditions permit. Unfortunately, in many circumstances lighting conditions cannot be altered, either because of the subject material or location constraints. The cinematographer has no choice but to use relatively more sensitive, albeit noisier, film stocks. Medium and high speed color negative stocks are often used in these applications, with use of film speeds of EI 200 and greater often being preferred. Additionally, blue screen and green screen color difference matte/subject separation algorithms are based on identifying colors of specific value. Accordingly, there is an added desire to work with origination films that exhibit low blue and green image noise (i.e., minimal granularity) for such applications, which property is typically not consistent with high sharpness.

PROBLEM TO BE SOLVED BY THE INVENTION

It would be desirable to provide a color photographic negative recording element having red, green, and blue color records which eliminates or substantially reduces red record dye fringe observed in developed negative images obtained when filming against a blue screen, green screen or black screen background, while maintaining desirably low granularity in the blue and green color records. It would be further desirable to provide such a film which provides a good sensitivity position to enable photographing to be done with relatively low light exposures.

SUMMARY OF INVENTION

The objects of this invention of solving the above problems generally are provided by a process of compositing two or more separate images comprising the steps of:

(a) imagewise exposing a color negative photographic recording material to a subject in front of a uniformly colored screen background, wherein the photographic recording material comprises a support bearing a red light sensitive color record comprising at least one red light sensitive silver halide emulsion and at least one cyan dye forming image coupler, a green light sensitive color record comprising at least one green light sensitive silver halide emulsion and at least one magenta dye forming image coupler, and a blue light sensitive color record comprising at least one blue light sensitive silver halide emulsion and at least one yellow dye forming image dye forming coupler, and further comprises at least one distributed red light absorbing compound, wherein the quantity of distributed red light absorbing compound is such as to reduce the sensitivity of the red light sensitive color record by at least 40%, and the light sensitivities of the green light sensitive color record and the blue light sensitive color record are each reduced by less than 20% by the presence of any distributed green light absorbing compounds or blue light absorbing compounds, (b) forming a color negative image of the subject and screen background by developing the exposed photographic material with a color developing agent, (c) separating the subject image of the color negative from the screen background image, and (d) compositing the separated subject image with a second image.

The objects of this invention are additionally achieved by providing a speed balanced color negative photographic recording material comprising a support bearing:

a red light sensitive color record comprising at least one red light sensitive silver halide emulsion and at least one cyan dye forming image coupler, a green light sensitive color record comprising at least one green light sensitive silver halide emulsion and at least one magenta dye forming image coupler, a blue light sensitive color record comprising at least one blue light sensitive silver halide emulsion and at least one yellow dye forming image dye forming coupler, and at least one distributed red light absorbing compound, wherein the quantity of distributed red light absorbing compound is such as to reduce the sensitivity of the red light sensitive color record by at least 40%, the light sensitivities of the green light sensitive color record and the blue light sensitive color record are each reduced by less than 20% by the presence of green light absorbing compounds or blue light absorbing compounds, and the sensitivities of the red, green and blue light sensitive color records are balanced for either tungsten or day light exposures.

In preferred embodiments of this invention, at least one light sensitive layer of at least one color record of the color negative photographic material comprises a sensitized high aspect ratio tabular grain silver halide emulsion.

Another preferred embodiment of the invention is provided wherein the most sensitive photographic layer of at least one color record, and more preferably of at least the red and/or the green color record, comprises sensitized high aspect ratio tabular grain silver halide emulsions.

In an especially preferred embodiment, the majority of the photographic light sensitive layers of the photographic element comprise a sensitized high aspect ratio tabular grain silver halide emulsion.

ADVANTAGEOUS EFFECT OF THE INVENTION

The invention has numerous advantages over the prior art. The invention eliminates or substantially reduces red record fringe problems without significantly effecting granularity in the blue and green color records. The use of distributed red light absorbing compounds that may move between layers during formation of the photographic element or its later storage in accordance with preferred embodiments allows the introduction of the light absorbing compound into a single location of the multilayer photographic recording material during manufacture, simplifying this labor intensive process. In preferred embodiments, the invention allows almost full advantage to be taken of the high speed of tabular grains with markedly improved sharpness. In preferred embodiments, the invention provides an EI 200 speed negative with desirable granularity and considerable reduction of the red fringe problem. These and other advantages will be apparent from the description below.

DETAILED DESCRIPTION OF THE INVENTION

For color negative recording films of classical design, i.e. where the blue sensitive layer overlies the green sensitive layer which in turn overlies the red sensitive layer on a support, the red information of an image is normally the most unsharp (lowest MTF). This is believed to be primarily due to optical scattering that takes place as light traverses the multilayer film pack (see T. H. James, Ed., "The Theory of the Photographic Process," MacMillan, N.Y., 1977 and, in particular, at Chapter 20 of this text, pages 578–591, entitled "Optical Properties of the Photographic Emulsion," by J. Gasper and J. J. DePalma). This is generally not a significant problem for photographing typical scenes, however, as the human eye is most sensitive to green light rather than red, and accordingly the perceived sharpness of a scene is generally controlled primarily by the sharpness of the green color record. In any event, where it is desired to increase the sharpness of a particular color record in a photographic material, there are various known methods as discussed above in the Background section. Sharpness improvements are generally quantified by obtaining the Modulation Transfer Function (MTF) using 60% (or lower input) modulation. Surprisingly, it has been found that all prior art sharpness improving techniques do not necessarily reduce the red record fringing problem described above in spite of their ability to significantly boost red MTF. Accordingly, the standard MTF measurement is not a good predictor of a film's propensity to exhibit the red fringe problem.

It is standard trade practice to try to simultaneously minimize image noise (granularity) concomitant with maximizing image sharpness (acutance) and speed (sensitivity). For this reason, sharpness enhancing techniques which substantially reduce the inherent sensitivity of a film, such as the use of substantial quantities of light absorbing compounds, are not generally desirable. We have found, however, that it is necessary to employ significant quantities of a distributed red light absorbing compound in order to effect an acceptable reduction in red record fringing level of many color negative recording films. In accordance with the invention, the disadvantageous effect of the use of such high levels of light absorbing compounds is minimized by the use of a relatively inherently faster red light sensitive color record in a color balanced film which is reduced in sensitivity a significantly greater percentage by the presence of the red light absorbing compound than the green and blue light sensitive color records of the film are reduced by the presence of any distributed green light or blue light absorbing compounds. This approach has been found to substantially solve the red record fringe problem while maintaining good granularity in the blue and green color records, which is particularly important for blue screen and green screen matte photography.

The materials referred to as distributed red light absorbing compounds may conveniently take the form of soluble dyes which may migrate between layers during application of the photographic material coating liquid composition to cover a support to form photographic layers. They also may migrate during or after drying of the gelatin. As they have this property, they may be applied in the photographic element in any layer, either those containing emulsions or inner layers between emulsion layers or in the layers above the emulsion layers. In this application, the terms above, "top" and "surface" will refer to the portion of the photographic element that is directed towards the exposure source during use. In contrast, the terms "bottom" and "lower" will refer to those layers of the photographic element that are closer to the substrate on which the photosensitive layers lie and further from the source of exposure. In a photographic material the "most sensitive layer" in a color record of an element is the layer that comprises the silver halide most sensitive to the spectral region to which the color record is sensitized.

The invention of a distributed red light absorbing compound present in an amount sufficient to reduce sensitivity of the red light sensitive color record by at least 40 percent may also be described as having sufficient red light absorbing compound to reduce the exposure of the red color record by at least 40 percent. The photographic elements of the invention also may contain preferred tabular silver halide grains for a particular thickness and diameter. It is also possible that the distributed light absorbing compounds of the invention may be combined with spatially fixed dye that does not move from the layer in which it is present during application of the coating liquid compositions of the photographic element. The relationship between the distributed dye and the spatially fixed dye may be adjusted to achieve a particularly desired effect and sharpness. For instance, the spatially fixed dye could be utilized for absorption of a particular portion of a visible spectrum while the distributed dye could be utilized for absorbing a different portion of the visible spectrum.

The photographic materials of this invention contain dye image-forming color records sensitive to each of the three primary regions of the spectrum. In some cases the multicolor material may contain elements sensitive to other regions of the spectrum or to more than three regions of the spectrum. Each color record can be comprised of a single emulsion layer or of multiple emulsion layers sensitive to a given region of the spectrum. The layers of the material, including the layers of the image-forming elements, can be arranged in various orders as known in the art.

As used herein, the terms "element", "color element", "record" and "color record" refer to one or more silver halide containing layers sensitive to the same wavelength region of the electromagnetic spectrum. The region from about 400 nm to 500 nm is generally referred to as blue light, the region from about 500 nm to 600 nm as green light and the region from about 600 nm to 750 nm as red light.

A typical multicolor photographic material comprises a support bearing a cyan dye image-forming element comprising at least one red-sensitive silver halide emulsion layer having associated therewith at least one cyan dye-forming coupler, a magenta image forming element comprising at least one green-sensitive silver halide emulsion layer having at least one magenta dye-forming coupler and a yellow dye image-forming element comprising at least one blue-sensitive silver halide emulsion layer having associated therewith at least one yellow dye-forming coupler. In some instances it may be advantageous to employ other pairings of silver halide emulsion sensitivity and dye image-forming couplers, as in the pairing of an infra-red sensitized silver halide emulsion with a magenta dye-forming coupler or in the pairing of a blue-green sensitized emulsion with a coupler enabling minus-cyan dye formation. The material can contain additional layers, such as filter layers, interlayers, overcoat layers, subbing layers, and the like. The layers of the material above the support typically have a total thickness of between about 5 and 30 microns. The total silver content of the material is typically between 1 and 10 grams per m².

It is generally preferred to minimize the thickness of the photographic material above the support so as to improve sharpness and improve access of processing solutions to the components of the material. For this reason, overall thicknesses of less than about 25 microns are preferred and thicknesses of less than about 20 microns are even more preferred. It is additionally preferred to minimize the total thicknesses of the color forming layers as measured from the portion of a light sensitive layer closest to the support to the portion of a light sensitive layer furthest from the support. Total color forming layer thicknesses of between about 25 and 3 microns are generally useful, while thicknesses between about 20 and about 5 microns are preferred, and thicknesses between about 18 and 8 microns are most preferred. These lowered thicknesses can be especially enabled at manufacture by use of surfactants, polymers, and other coatings aids as known in the art so as to control surface tension and viscosity. Other polymeric materials, humectants, and gelatin plasticizers are known to improve hardening leading to better physical integrity and reduced sensitometric variability over time. Both sharpness and ease of processing may be further improved by minimizing the quantity of incorporated silver in the element. Total silver of less than about 7 grams per square meter is preferred and total silver of less than about 5 grams per square meter is even more preferred. Sharpness in color images is further improved by complete removal of silver and silver halide from the element on processing. Since more highly swellable elements enable better access of components of processing solutions to the elements of this invention, swell ratios above 1.25 are preferred, with swell ratios of between 1.4 and 6 being more preferred and swell ratios of between 1.7 and 3 being most preferred. The balance of total thickness, imaging layer thickness, total silver and swell ratio most suitable for an element intended for a specific purpose being readily derived from the image structure, color reproduction, sensitivity and physical integrity and photographic resistance to pressure required for that purpose as known in the art. Use of polymeric materials and gelatin levels as known in the art to further control these photographic and physical properties is recommended.

The photographic materials of this invention can have any photographic sensitivity known in the art. Use of the highest possible sensitivity while maintaining other useful properties is generally preferred in films designed for general use, while the lower sensitivities are more preferred in those situations demanding excellent image structure. In preferred embodiments of the invention, the blue, green and red color records are balanced for exposure to a particular illuminant, such as tungsten light or day light, intended to be used with material. A balanced film in accordance with the invention when exposed by a sensitometer using light of a spectral distribution equivalent to the specified color temperature (e.g., Tungsten light or day light) and processed according to standard conditions results in the cyan, magenta and yellow dye layers having densities 0.2 above base density within 0.1 log H exposure of one another (speed balance), and also preferably cyan, magenta and yellow densities 0.65 above base densities within 0.08 log H of each other (mid scale color balance). As the sensitivity of a silver halide emulsion is related to the size of the emulsion grains, Tungsten balanced films (e.g., 3200K color temperature) and day light balanced films (e.g., 5500K color temperature) may be conveniently obtained in accordance with the invention through use of red light sensitive emulsions which are relatively larger compared to green light sensitive emulsions which are used in the film, along with the use of red light absorbing compounds to decrease the sensitivity of the red record to match that of the green record when exposed to the particular illuminant.

The photographic materials of the present invention are preferably motion picture origination film materials. Such materials typically have a width of up to 100 millimeters (or only up to 70 or 50 millimeters), and a length of at least 30 meters (or optionally at least 100 or 200 meters). Manufactured motion picture materials are typically provided to a user with an Exposure Index (EI) speed value of the film indicated on the film or its packaging for either Tungsten or day light illumination. Materials in accordance with the invention allow relatively high speed films (e.g., Tungsten balanced EI 200 and above) to be used which provide good perceived granularity (due to use of blue and green color records which are not significantly reduced in sensitivity due to the presence of any distributed light absorbing compounds) while substantially reducing the red record fringe problem which frequently results from blue, green, or black screen matte photography exposures.

In the following discussion of suitable compounds for use in the material of this invention, reference will be made to *Research Disclosure*, December 1989, Item 308119, published by Kenneth Mason Publications, Ltd., The Old Harbourmaster's 8 North Street, Emsworth, Hampshire P010 7DD, ENGLAND, the disclosure of which are incorporated herein by reference. This publication will be identified hereafter by the tern "Research Disclosure".

The silver halide emulsions employed in the material of this invention can be comprised of silver bromide, silver chloride, silver iodide, silver chlorobromide, silver chloroiodide, silver bromoiodide, silver chlorobromoiodide or mixtures thereof. The emulsions can include silver halide grains of any conventional shape or size. Specifically, the emulsions can include coarse, medium or fine silver halide grains. High aspect ratio tabular grain emulsions are specifically contemplated, such as those disclosed by Wilgus et al U.S. Pat. No. 4,434,226; Daubendiek et al U.S. Pat. No. 4,414,310; Wey U.S. Pat. No. 4,399,215; Solberg et al U.S. Pat. No. 4,433,048; Mignot U.S. Pat. No. 4,386,156; Evans et al U.S. Pat. No. 4,504,570; Maskasky U.S. Pat. No. 4,400,463; Wey et al U.S. Pat. No. 4,414,306; Maskasky U.S. Pat. Nos. 4,435,501 and 4,643,966, and Daubendiek et al U.S. Pat. Nos. 4,672,027 and 4,693,964. Also specifically contemplated are those silver bromoiodide grains with a higher molar proportion of iodide in the core of the grain than in the periphery of the grain, such as those described in G. B. Patent 1,027,146; Japanese 54/48521; U.S. Pat. No. 4,379,837; U.S. Pat. No. 4,444,877; U.S. Pat. No. 4,665,012; U.S. Pat. No. 4,686,178; U.S. Pat. No. 4,565,778; U.S. Pat. No. 4,728,602; U.S. Pat. No. 4,668,614; U.S. Pat. No. 4,636,461; EP 264,954; and U.S. Ser. No. 842,683 of Antoniades et al filed Feb. 27, 1992. Also suitable for the invention are tabular silver chloride grains such as disclosed in U.S. Pat. Nos. 5,176,991; 5,176,992; 5,178,998; 5,183,732; and 5,185,239 and European Patent Publication 0 534 395. The silver halide emulsions can be either monodisperse or polydisperse as precipitated. The grain size distribution of the emulsions can be controlled by silver halide grain separation techniques or by blending silver halide emulsions of differing grain sizes.

The sensitized high aspect ratio tabular grain silver halide emulsions useful in preferred embodiments of this invention are like those disclosed by Kofron et alia in U.S. Pat. No. 4,439,520 and in the additional references cited above. These high aspect ratio tabular grain silver halide emulsions and other emulsions useful in the practice of this invention can be characterized by geometric relationships, specifically the Aspect Ratio and the Tabularity. The Aspect Ratio (AR) and the Tabularity (T) are defined by the following equations:

$$AR = \text{(Equivalent Circular Diameter)/(Thickness)}$$

$$T = \text{(Equivalent Circular Diameter)/(Thickness)}^2$$

where the equivalent circular diameter and the thickness of the grains, measured using methods commonly known in the art, are expressed in units of microns.

High Aspect Ratio Tabular Grain Emulsions have an average AR greater than 8 and are most preferred to have an AR>10. These useful emulsions additionally can be characterized in that their average Tabularity is generally greater than 25 and they have a preferred Tabularity of greater than 50 for best sharpness while having good speed. In preferred embodiments of the invention, at least one light sensitive layer of each of the red and the green color records comprises a sensitized tabular grain silver halide emulsion having an average aspect ratio greater than about 8, and the ratio of the average equivalent circular diameter of the largest tabular grain silver halide emulsion of the red color record comprising at least 10% of the total red record silver halide to the average circular diameter of the largest tabular grain silver halide emulsion of the green color record comprising at least 10% of the total green record silver halide is greater than or equal to 1.25, more preferably at least 1.4 and most preferably at least 1.5. Use of emulsions of such size enable Tungsten or day light balanced films to be obtained which also meet the blue, green and red record sensitivity requirements of the invention to be achieved so as to substantially eliminate or reduce red record fringe problems while minimizing blue and green record granularity.

Sensitizing compounds, such as compounds of copper, thallium, lead, bismuth, cadmium and Group VIII noble metals, can be present during precipitation of the silver halide emulsion.

The emulsions can be surface-sensitive emulsions, i.e., emulsions that form latent images primarily on the surfaces of the silver halide grains, or internal latent image-forming emulsions, i.e., emulsions that form latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

The silver halide emulsions can be surface sensitized. Noble metal (e.g., gold), middle chalcogen (e.g., sulfur, selenium, or tellurium), and reduction sensitizers, employed individually or in combination, are specifically contemplated. Typical chemical sensitizers are listed in *Research Disclosure*, Item 308119, cited above, Section III.

The silver halide emulsions can be spectrally sensitized with dyes from a variety of classes, including the polymethine dye class, which includes the cyanines, merocyanines, complex cyanines, and merocyanines (i.e., tri-, tetra-, and poly-nuclear cyanines and merocyanines), oxonols, hemioxonols, styryls, merostyryls, and streptocyanines. Illustrative spectral sensitizing dyes are disclosed in *Research Disclosure*, Item 308119, cited above, Section IV.

Spatially fixed dyes or other light absorbing compounds useful in combination with the distributed red light absorbing compounds of this invention are well known in the art. By spatially fixed, it is meant that little or none of the light absorbing compound will migrate out of the layer in which it has been incorporated before the photographic material has been processed. Spatially fixed dyes are also known as non-diffusible dyes and as anti-halation dyes. Typical examples of spatially fixed dyes, their preparation and methods of incorporation in photographic materials are disclosed in U.S. Pat. Nos. 4,855,220; 4,746,600; and 4,956,269, as well as by commercially available materials. Other examples of spatially fixed dye are disclosed at Section VIII of Research Disclosure. These dyes may be ballasted to render them non-diffusible or they may be intrinsically diffusible but rendered non-diffusible by use of organic mordanting materials, such as charged or uncharged polymeric matrixes, or rendered non-diffusible by adhesion to inorganic solids such as silver halide, or organic solids all as known in the art. Alternatively, these dyes may be incorporated in polymeric latexes, or incorporated in the form of solid particle dye dispersions. These dyes may additionally be covalently bound to polymeric materials.

These dyes may retain their color after processing or may change in color, be decolorized or partially or completely removed from the photographic material during processing. For ease of direct viewing or optical printing it may be preferred that the dyes be removed from the material or be rendered non-absorbing in the visible region during or after processing. During photographic development (generally in high pH, e.g. 9 or above, sulfite containing processing solution), bleaching (in iron containing or persulfate or other peroxy containing solutions at lower pH, e.g. 7 or below) or fixing, the dye may be decolorized or removed from the material. In photographic materials where the image may be electronically scanned or digitally manipulated, the material may or may not retain some degree of coloration depending on the intended use.

The spatially fixed dye may be a diffusible acidic dye that is rendered non-diffusible by incorporating a base group-containing polymeric mordant for the dye at a specified position in the photographic material. Such dyes preferably have a sulfo- or carboxy- group. Useful dyes can be acidic dyes of the azo type, the triphenylmethane type, the anthroquinone type, the styryl type, the oxonol type, the arylidene type, the merocyanine type, and others known in the art. Polymer mordants are well known in the art and are described, for example, in U.S. Pat. Nos. 2,548,564; 2,675,316; 2,882,156; and 3,706,563 as well as in *Research Disclosure,* Item 308119, Section VIII.

The spatially fixed dye may also be a solid particle dispersion of a loaded polymer latex of a dye that is insoluble at coating pH but soluble at processing pH's as described in U.S. Pat. No. 4,855,211—Factor et al.

Additionally, the dye may be a colored image dye-forming coupler as disclosed in *Research Disclosure,* Item 308119, Section VII. The color of such a dye may be changed during processing. The dye may be a pre-formed image coupler dye which would generally remain in the material during processing. The dye may also be a spectral sensitizing dye immobilized by adsorption to chemically unsensitized silver halide. Such a dye would generally be removed from the material during the bleaching or fixing step.

Examples of useful spatially fixed dyes include the dye materials described in the photographic examples below as well as in the disclosures cited above.

The distributed red light absorbing compounds used in accordance with this invention may suitably be any of the red light absorbing soluble dyes known in the art as disclosed commercially, in U.S. Pat. Nos. 4,855,220; 4,746,600; and 4,956,269, or at Section VIII of *Research Disclosure* cited earlier. By distributed, it is meant that quantities of the compound (or of combinations of such compounds) are present in several of the layers of the photographic material before the exposure of said material. It is preferred that such distributed dyes be positioned both closer to, coincident with and further from the image exposure source than the photographic layers of the red light sensitive record. The preferred soluble dyes generally are diffusible and have the property of distributing within the structure of a photographic material to a greater or lesser extent during a wet coating procedure or during a subsequent curing or storage procedure. Alternatively, these dyes may be added to a photographic material in a subsequent coating, imbibing or like procedure as known in the art. These soluble dyes may additionally be caused to distribute in specific patterns within a photographic material by the addition of mordanting materials in appropriate quantities and positions within the structure of the photographic material. The mordanting material may be the charged or uncharged polymeric materials. Alternatively, the distribution of the dye may be controlled by the quantity and disposition of hydrophobic organic materials such as couplers or coupler solvents or absorbent charged or uncharged inorganic materials such as silver halide and the like within the coating structure.

Alternatively, but less preferred, non-diffusible dyes may be employed and distributed in the photographic material by placement in multilple layers thereof. These may include any of the non-diffusible dyes previously described. When non-diffusible dyes are employed they may be distributed within a photographic material by addition of a portion of each to the photographic layers as they are coated.

The red light absorbing dye absorbs light in the region of the spectrum to which the red record silver halide layers of the invention is sensitized. While the dye will generally absorb light primarily only in that region, use of dyes that absorb light in other regions of the spectrum as well as the region to which the red record silver halide is sensitized are also included within the scope of the invention. A simple test as to whether the distributed red light absorbing compound is within the scope of the invention is if the speed of the red record of the invention is reduced by at least 40% by the presence of the distributed dye, while the speed of the green and blue records are reduced by less than 20%, then the distributed light absorbing compound is within the scope of the invention. Sensitivity reductions in the red record of about 50% or more are preferred with sensitivity reductions of about 60%, 75% or of up to 95% contemplated. When both distributed and spatially fixed absorber dyes are employed in combination, red record sensitivity reductions of 40% or more based on the presence of both dyes are specifically contemplated. Red light absorbing compounds may be used at whatever coverage level necessary to achieve such results. Soluble red light absorbing dyes may typically be used, e.g., at levels from about 1 to 100 mg/m$^2$, more typically from about 10 to 50 mg/m$^2$ to achieve at least a 40% reduction in red record sensitivity. Actual amounts required will of course depend upon the efficacy of the specific dye used.

The red light absorbing compounds may retain their color after processing or may change in color, be decolorized or partially or completely removed from the photographic material during processing. For ease of direct viewing or optical printing it may be preferred that the dyes be removed from the film or rendered non-absorbing in the visible region during or after processing. During photographic development (generally in high pH, e.g., 9 or above, sulfite containing processing solution), bleaching (in iron containing or persulfate or other peroxy containing solutions at lower pH, e.g., 7 or below) or fixing, the dye may be decolorized or removed from the material. In photographic recording materials where the image is to be electronically scanned and digitally manipulated such as in matte screen photography, the material may or may not retain some degree of coloration depending on the intended use.

The distributed dye may be a diffusible acidic dye. Such dyes preferably have a sulfo- or carboxy- group. Useful dyes can be acidic dyes of the azo type, the triphenylmethane type, the anthroquinone type, the styryl type, the oxanol type, the arylidene type, the merocyanine type, and others known in the art.

Specific examples of distributed dyes are shown in the literature cited earlier and in the examples illustrating the practice of the invention. Representative red light absorbing dyes include cyan dyes Dye 1 and Dye 3.

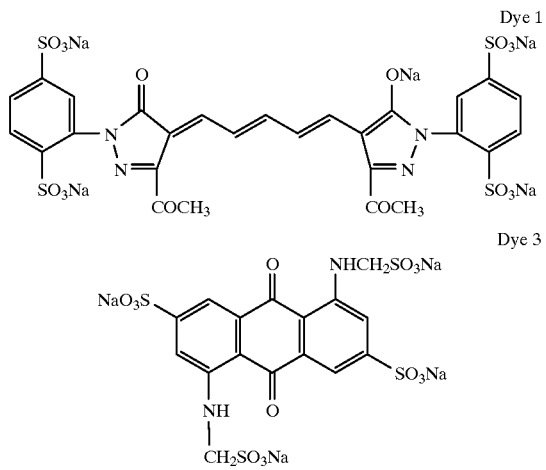

The thicknesses of the silver halide emulsions employed in this invention may be advantageously adjusted for the purposes of improving film performance according to principles described in *Research Disclosure, May,* 1985, Item 25330. This disclosure teaches, by extrapolation from the optical properties of silver bromide sheet crystals, that the thicknesses of silver halide emulsions incorporated in specific photographic layers and sensitized to one spectral region may be chosen to enable either improved speed or improved sharpness behavior in other photographic layers incorporating silver halide emulsions sensitized to different regions of the spectrum. These improvements are said to occur because the light transmission and reflection properties of the silver halide emulsions are controlled in large part by their grain thicknesses. Further discussion on the relationship between the thickness of silver halide crystals and their reflectance properties can be found in Optics, by J. M. Klein, John Wiley & Sons, New York, 1960, pages 582 to 585. These disclosures make no teaching about the relationship between the thickness of a silver halide emulsion sensitized to a particular region of the spectrum and the sharpness behavior of a photographic layer or element using such an emulsion.

Further discussions as to optimizing emulsion grain thicknesses for improving sharpness are found, e.g., in U.S. Pat. No. 5,395,744, the disclosure of which is incorporated herein by reference.

The photographic materials of this invention may additionally comprise Development Inhibitor Releasing Compounds, also called DIR compounds as known in the art. Typical examples of DIR compounds, their preparation and methods of incorporation in photographic materials are disclosed in U.S. Pat. Nos. 4,855,220 and 4,746,600 as well as by commercially available materials. Other examples of useful DIR compounds are disclosed at Section VIIF of *Research Disclosure*. DIR compounds may be incorporated in the same layer as high aspect ratio emulsions, in reactive association with such layers or in a different layer of the photographic material, all as known in the art. DIR compounds may be among those classified as "diffusible," meaning that they enable release of a highly transportable inhibitor moiety or they may be classified as "non-diffusible" meaning that they enable release of a less transportable inhibitor moiety. The DIR compounds may comprise a timing or linking group as known in the art.

The inhibitor moiety of the DIR compound may be unchanged as the result of exposure to photographic processing solution. However, the inhibitor moiety may change in structure and effect in the manner disclosed in U. K. Patent No. 2,099,167; European Patent Application 167,168; Japanese Kokai 205150/83 or U.S. Pat. No. 4,782,012 as the result of photographic processing.

The development inhibitor can be attached to any moiety from which it can be released during the development step. Typically, the compound contains a carrier group from which the inhibitor is released either directly or from an intervening timing or linking group which is first released from the carrier group.

Carrier groups useful in DIR compounds include various known groups from which the development inhibitor can be released by a variety of mechanisms. Representative carrier groups are described, for example, in U.S. Pat. No. 3,227,550 and Canadian Patent 602,607 (release by chromogenic coupling); U.S. Pat. Nos. 3,443,939 and 3,443,940 (release by intramolecular ring closure); U.S. Pat. Nos. 3,628,952; 3,698,987; 3,725,062; 3,728,113; 3,844,785; 4,053,312; 4,055,428 and 4,076,529 (release after oxidation of carrier); U.S. Pat. Nos. 3,980,479; and 4,199,335 and U.K. Patents 1,464,104 and 1,464,105 (release unless carrier is oxidized); and U.S. Pat. No. 4,139,379 (release after reduction of carrier).

The timing or linking group of the DIR compound can be any organic linking group which will serve to join the development inhibitor moiety to the carrier moiety and which, after its release from the carrier, will be cleaved from the development inhibitor moiety. Such groups are described, e.g., in U.S. Pat. Nos. 4,248,962; 4,409,323; and 4,861,701.

When the DIR compound is a developing agent of the type disclosed, for example, at U.S. Pat. No. 3,379,529, the development inhibitor is imagewise released as a result of silver halide development by the developing agent, optionally in the presence of an auxiliary developing agent.

When the DIR compound is a hydroquinone compound of the type described, for example, in European Patent Application 0,167,168, the development inhibitor is imagewise released by a redox reaction in the presence of an oxidized developing agent.

When the DIR compound is a coupler, the development inhibitor group is imagewise released by a coupling reaction between the coupler and oxidized color developing agent. The carrier moiety can be any coupler moiety employed in conventional color photographic couplers which yields either colored or a colorless reaction product. Especially preferred are coupler compounds, including both dye forming couplers and so called "universal" couplers which do not form a permanent colored species on reaction with oxidized silver halide developing agent.

For a DIR compound to be in reactive association with a light sensitive layer means that development in that layer causes the DIR compound to release a development inhibitor or precursor thereof.

For a DIR coupler to be in reactive association with a light sensitive layer means that color development in that layer results in production of an oxidized form of the color developing agent, the oxidized form of the color developing agent in turn reacts with the DIR coupler in a coupling reaction which results in liberation of a development inhibitor or precursor thereof from the DIR coupler.

The DIR compounds can be employed in any quantity known in the art. Typically, total quantities of all DIR compounds greater than about 0.01 mole percent relative to all sensitized silver halide, and more commonly quantities greater than about 0.07 mol percent are employed. It is preferred to employ between about 0.07 and 10 mole percent of total DIR compound total to sensitized silver halide, more preferred to employ between 0.1 and 5 mole percent and most preferred to employ between about 0.15 and 4 mole percent relative to all sensitized silver halide.

When the DIR compounds are dye-forming couplers, they may be incorporated in reactive association with complementary color sensitized silver halide emulsions, as for example a cyan dye-forming DIR coupler with a red sensitized emulsion or in a mixed mode, as for example a yellow dye-forming DIR coupler with a green sensitized emulsion, all as known in the art.

The DIR compounds may also be incorporated in reactive association with bleach accelerator releasing couplers as disclosed in U.S. Pat. Nos. 4,912,024, and 5,135,839 and in U.S. application Ser. No. 563,725 filed Aug. 8, 1990.

Specific DIR compounds useful in the practice of this invention are disclosed in the above cited references, in commercial use and in the examples demonstrating the practice of this invention which follow.

Suitable vehicles for the emulsion layers and other layers of photographic materials of this invention are described in *Research Disclosure* Item 308119, Section IX, and the publications cited therein.

In addition to the couplers described herein, the materials of this invention can include additional couplers as described in *Research Disclosure* Section VII, paragraphs D, E, F, and G, and the publications cited therein. These additional couplers can be incorporated as described in *Research Disclosure* Section VII, paragraph C, and the publications cited therein.

The photographic materials of the invention may also comprise Bleach Accelerator Releasing (BAR) compounds as described in European Patents 0 193 389 B and 0 310 125; and at U.S. Pat. No. 4,842,994, and Bleach Accelerator Releasing Silver Salts as described at U.S. Pat. Nos. 4,865, 956 and 4,923,784 hereby incorporated by reference. Other useful bleaching and bleach accelerating compounds and solutions are described in the above publications, the disclosures of which are incorporated by reference.

The photographic materials of this invention can be used with colored masking couplers as described in U.S. Pat. Nos. 4,883,746 and 4,833,069.

The photographic materials of this invention can contain brighteners (*Research Disclosure* Section V), antifoggants and stabilizers (*Research Disclosure* Section VI), antistain agents and image dye stabilizers (*Research Disclosure* Section VII, paragraphs I and J), light absorbing and scattering materials (*Research Disclosure* Section VIII), hardeners (*Research Disclosure* Section XI), plasticizers and lubricants (*Research Disclosure* Section XII), antistatic agents (*Research Disclosure* Section XI), matting agents (*Research Disclosure* Section XVI), and development modifiers (*Research Disclosure* Section XXI).

The photographic materials can comprise polymer latexes as described in U.S. patent application Ser. Nos. 720,359 and 720,360 filed Jun. 25, 1991, and 771,016 filed Oct. 1, 1991, and in U.S. Pat. Nos. 3,576,628; 4,247,627; and 4,245,036, the disclosures of which are incorporated by reference.

The photographic materials can be coated on a variety of supports as described in Research Disclosure Section XVII and the references described therein.

Photographic materials can be exposed to actinic radiation, typically in the visible region of the spectrum, to form a latent image as described in *Research Disclosure* Section XVIII and then processed to form a visible dye image as described in *Research Disclosure* Section XIX. Processing to form a visible dye image includes the step of contacting the material with a color developing agent to reduce developable silver halide and oxidize the color developing agent. Oxidized color developing agent in turn reacts with the coupler to yield a dye.

Development is followed by the conventional steps of bleaching, fixing, or bleach-fixing to remove silver and silver halide, washing, and drying.

Typical bleach baths contain an oxidizing agent to convert elemental silver, formed during the development step, to silver halide. Suitable bleaching agents include ferricyanides, dichromates, ferric complexes of aminocarboxylic acids, such as ethylene diamine tetraacetic acid and 1,3-propylene diamine tetraacetic acid as described at *Research Disclosure,* Item No. 24023 of April, 1984. Also useful are peroxy bleaches such as persulfate, peroxide, perborate, and percarbonate. These bleaches may be most advantageously employed by additionally employing a bleach accelerator releasing compound in the film structure. They may also be advantageously employed by contacting the film structure with a bleach accelerator solution during photographic processing. Useful bleach accelerator releasing compounds and bleach accelerator solutions are discussed in European Patents 0 193 389B and 0 310 125A; and in U.S. Pat. Nos. 4,865,956; 4,923,784; and 4,842,994, the disclosures of which are incorporated by reference.

Fixing baths contain a complexing agent that will solubilize the silver halide in the element and permit its removal from the element. Typical fixing agents include thiosulfates, bisulfites, and ethylenediamine tetraacetic acid. Sodium salts of these fixing agents are especially useful. These and other useful fixing agents are described in U.S. Pat. No. 5,183,727, the disclosures of which are incorporated by reference. In some cases the bleaching and fixing baths are combined in a bleach/fix bath.

The elements of the present invention may be imagewise exposed with a normal exposure according to the illumination type and speed value indicated with the film or other manufacturer recommendations, and processed according to the processing conditions indicated on the film or its packaging. Alternative processing techniques, however, such as under or over exposure, can also be used with films according to the invention if desired.

By "indicated" in relation to the film speed and processing conditions, means that some designation is provided on the film or its packaging or associated with one or the other, which allows the user to ascertain the manufacturer's speed rating (or film processing conditions). Such a designation can be a film speed number (such as Film Speed, or ASA Film Speed), or in the case of processing conditions, an actual statement of the conditions or reference to a well-known standard processing method (for example, Kodak ECN-2 processing). Alternatively, such a designation can be a film identification designation (such as a number or film name) which allows a user to match the film with the manufacturer's speed designation or processing conditions (such as from a catalogue, brochure or other source).

As described above, the process of compositing two or more separate images in accordance with the invention comprises the steps of: imagewise exposing a color photographic recording material according to the invention to a subject in front of a uniformly colored screen background, forming a color negative image of the subject and screen background by developing the exposed photographic material with a color developing agent, separating the subject image of the color negative from the screen background image, and compositing the separated subject image with a second image.

The uniformly colored screen background in such process preferably comprises a blue screen, green screen, or black screen background, more preferably a blue screen or a green screen background. The color negative image is preferably digitized with a film scanner and the subject image of the color negative is preferably separated from the screen background image with conventional software algorithms. Such algorithms are well known in the art, and the process of the invention is not limited to use of any particular one. The separated subject image substantially free of red record fringe artifact may then be digitally composited with other images as is well known in the art.

The following examples illustrate the practice of this invention. They are not intended to be exhaustive of all possible variations of the invention. Parts and percentages are by weight unless otherwise indicated. Silver halide emulsions employed to demonstrate the practice of this invention may be precipitated and sensitized according to the procedures as described in the above referenced patents.

EXAMPLES

The following layers were coated on a transparent base to make films of the following description. All laydowns are in units of milligrams per square meter.

| | Sample Number | | | | | | |
|---|---|---|---|---|---|---|---|
| | 1-1 | 2-1 | 3-1 | 4-1 | 5-1 | 6-1 | 7-1 |
| Layer 1 | | | | | | | |
| Slow Cyan Emulsion | 955 | 985 | 954 | 718 | 1049 | 954 | 952 |
| Mid Cyan Emulsion | 677 | 160 | 677 | 877 | 565 | 677 | 675 |
| Coupler 1 | 374 | 418 | 350 | 440 | 0 | 372 | 280 |
| Oxidized Coupler 2 | 0 | 19 | 0 | 0 | 0 | 0 | 0 |
| Coupler 3 | 65 | 0 | 65 | 0 | 0 | 65 | 65 |
| Coupler 4 | 26 | 0 | 19 | 0 | 0 | 26 | 26 |
| Coupler 5 | 17 | 0 | 45 | 0 | 0 | 17 | 17 |
| Coupler 6 | 22 | 0 | 22 | 0 | 0 | 22 | 22 |
| Coupler 7 | 0 | 37 | | 55 | 22 | 0 | 0 |
| Coupler 8 | 11 | 24 | 11 | 27 | 68 | 11 | 11 |
| Gelatin | 2113 | 2206 | 2098 | 2765 | 2035 | 2082 | 1991 |
| Layer 2 | | | | | | | |
| Fast Cyan Emulsion | 775 | 953 | 872 | 1361 | 861 | 678 | 775 |
| Mid Cyan Emulsion | 194 | | 97 | 0 | 0 | 291 | 194 |
| Coupler 1 | 63 | 100 | 54 | 0 | 0 | 53 | 60 |
| Coupler 8 | 11 | 11 | 16 | 0 | 0 | 16 | 16 |
| Coupler 3 | 47 | 32 | 44 | 33 | 0 | 41 | 47 |
| Coupler 5 | 0 | 41 | 0 | 33 | 0 | 0 | 0 |
| Coupler 6 | 22 | 0 | 22 | 0 | 0 | 22 | 22 |
| Coupler 9 | 0 | 0 | 0 | 0 | 28 | 0 | 0 |
| Coupler 10 | 0 | 0 | 0 | 106 | 0 | 0 | 0 |
| Gelatin | 1331 | 1501 | 1308 | 1515 | 1247 | 1278 | 1410 |
| Layer 3 | | | | | | | |
| Didodecylhydroquinone | 108 | 30 | 108 | 111 | 140 | 119 | 108 |
| Coupler 11 | 51 | 5 | 48 | 70 | 82 | 53 | 48 |
| Oxidized Coupler 12 | 0 | 0 | 12 | 0 | 0 | 7 | 11 |
| Coupler 13 | 0 | 24 | 0 | 0 | 16 | 0 | 0 |
| Dye 1 | 0 | 0 | 24 | 0 | 0 | 19 | 0 |
| | | | | | | | 0 |
| Gelatin | 1077 | 807 | 1077 | 656 | 542 | 1185 | 829 |
| Layer 4 | | | | | | | |
| Slow Magenta Emulsion | 484 | 919 | 852 | 852 | 1087 | 681 | 852 |
| Mid Magenta | 0 | 693 | 568 | 568 | 638 | 454 | 568 |

-continued

| | Sample Number | | | | | | |
|---|---|---|---|---|---|---|---|
| | 1-1 | 2-1 | 3-1 | 4-1 | 5-1 | 6-1 | 7-1 |
| Emulsion | | | | | | | |
| Coupler 14 | 86 | 330 | 355 | 547 | 548 | 656 | 547 |
| Coupler 15 | 0 | 21 | 20 | 20 | 28 | 24 | 20 |
| Coupler 16 | 69 | 153 | 142 | 142 | 0 | 171 | 144 |
| Coupler 17 | 99 | 0 | 0 | 0 | 0 | 0 | 0 |
| Gelatin | 947 | 2195 | 2295 | 2275 | 1852 | 1819 | 2290 |
| Layer 5 | | | | | | | |
| Mid Magenta Emulsion | 1292 | 0 | 0 | 0.0 | 0 | 0 | 0 |
| Coupler 14 | 48 | 0 | 0 | 0.0 | 0 | 0 | 0 |
| Coupler 15 | 13 | 0 | 0 | 0 | 0 | 0 | 0 |
| Coupler 16 | 69 | 0 | 0 | 0 | 0 | 0 | 0 |
| Coupler 17 | 94 | 0 | 0 | 0 | 0 | 0 | 0 |
| Gelatin | 1474 | 0 | 0 | 0 | 0 | 0 | 0 |
| Layer 6 | | | | | | | |
| Fast Magenta Emul. | 1033 | 1397 | 99 | 819 | 1199 | 982 | 819 |
| Slow Fast Magenta Emul. | 0 | 0 | 720 | 0 | 0 | 0 | 0 |
| Coupler 14 | 22 | 0 | 0 | 0 | 78 | 0 | 0 |
| Coupler 15 | 0 | 8 | 4 | 4 | 0 | 5 | 4 |
| Coupler 16 | 12 | 54 | 31 | 31 | 0 | 37 | 31 |
| Coupler 17 | 0 | 0 | 0 | 0 | 5 | 0 | 0 |
| Coupler 18 | 84 | 58 | 89 | 89 | | 89 | 89 |
| Gelatin | 1290 | 2195 | 1734 | 1734 | 1005 | 2014 | 1734 |
| Layer 7 | | | | | | | |
| Gelatin | 0 | 0 | 0 | 0 | 488 | 0 | 0 |
| Layer 8 | | | | | | | |
| Silver | 0 | 0 | 0 | 0 | 65 | 0 | 0 |
| Didodecylhydroquinone | 108 | 32 | 111 | 111 | 108 | 111 | 108 |
| Coupler 11 | 43 | 65 | 22 | 11 | 0 | 11 | 43 |
| Dye 2 | 151 | 54 | 89 | 89 | 0 | 89 | 151 |
| Gelatin | 646 | 807 | 665 | 665 | 488 | 665 | 665 |
| Layer 9 | | | | | | | |
| SLOW Yellow Emul | 506 | 348 | 219 | 219 | 142 | 219 | 156 |
| Mid Yellow Emul. | 194 | 252 | 563 | 563 | 232 | 563 | 625 |
| Coupler 6 | 74 | 510 | 657 | 597 | 0 | 555 | 614 |
| Coupler 19 | 465 | 0 | 0 | 0 | 0 | 0 | 0 |
| Coupler 20 | 42 | 0 | 0 | 0 | 0 | 0 | 0 |
| Coupler 21 | 0 | 19 | 28 | 28 | 0 | 28 | 28 |
| Coupler 22 | 0 | 0 | 0 | 0 | 1127 | 0 | 0 |
| Gelatin | 1614 | 1267 | 1590 | 1569 | 1184 | 1537 | 1569 |
| Layer 10 | | | | | | | |
| Fast Yellow Emul | 1801 | 784 | 1076 | 1076 | 985 | 1076 | 1076 |
| Coupler 6 | 268 | 226 | 215 | 230 | 0 | 230 | 230 |
| Coupler 19 | 85 | 0 | 0 | 0 | 0 | 0 | 0 |
| Coupler 23 | 0 | 30 | 6 | 6 | 0 | 6 | 6 |
| Coupler 22 | 0 | 0 | 0 | 0 | 143 | 0 | 0 |
| Gelatin | 1905 | 949 | 1217 | 1217 | 734 | 1217 | 1217 |

Additional sample films were prepared as follows:

Sample 4-2 is like 4-1, except that 43.0 mg. per square meter of distributed soluble cyan (red light absorbing) dye 3 was added to layer 3.

Sample 4-3 is like 4-1, except that 17.2 mg. per square meter of distributed soluble cyan (red light absorbing) dye 1 was added to layer 3.

Sample 4-4 is like 4-1, except that 38.7 mg. per square meter of a solid particle dispersion of positioned (non-diffusable) cyan (red light absorbing) dye 4 was added to layer 1.

Samples 4-5 is a repeat coating like sample 4-1.

Sample 6-2 is like 6-1, except 29.1 mg per square meter of positioned dye 4 was added to layer 3.

Surfactants were added as coating aids where appropriate as is commonly done in the art. An ultraviolet absorbing layer and a protective overcoat layer were coated over layer 10. The emulsion specified above and the structures of some of the components are listed below.

The equivalent diameter and thickness for the tabular grains and the size of the 3D grains for the various emulsions used in the samples are indicated below. All tabular grain emulsions comprised silver bromoiodide, with from about 1 to 6 mole % iodide. The dimensions are in microns.

| Emulsions | Diameter | Thickness | Shape |
|---|---|---|---|
| Sample 1-1 | | | |
| Fast Yellow | 2.02 | ** | 3D |
| Mid Yellow | 2.67 | 0.14 | Tabular |
| Slow Yellow | 1.58 | 0.127 | Tabular |
| Fast Magenta | 3.2 | 0.113 | Tabular |
| Mid Magenta | 1.14 | 0.14 | Tabular |
| Slow Magenta | 0.65 | 0.14 | Tabular |
| Fast Cyan | 2.7 | 0.11 | Tabular |
| Mid Cyan | 1.3 | 0.14 | Tabular |
| Slow Cyan | 0.96 | 0.11 | Tabular |
| Sample 2-1 | | | |
| Fast Yellow | 2.38 | 0.115 | Tabular |
| Mid Yellow | 1.23 | 0.111 | Tabular |
| Slow Yellow | 1.03 | 0.11 | Tabular |
| Fast Magenta | 1.07 | 0.119 | Tabular |
| Mid Magenta | 1.04 | o.115 | Tabular |
| Slow Magenta | 0.613 | 0.107 | Tabular |
| Fast Cyan | 1.2 | 0.135 | Tabular |
| Mid Cyan | 0.88 | 0.112 | Tabular |
| Slow Cyan | 0.64 | 0.106 | Tabular |
| Sample 3-1 | | | |
| Fast Yellow | 1.29 | ** | 3D |
| Mid Yellow | 2.49 | 0.12 | Tabular |
| Slow Yellow | 1.03 | 0.11 | Tabular |
| Fast Magenta | 3.2 | 0.113 | Tabular |
| Slow F Magenta | 2.11 | 0.125 | Tabular |
| Mid Magenta | 1.06 | 0.12 | Tabular |
| Slow Magenta | 0.66 | 0.12 | Tabular |
| Fast Cyan | 3.1 | 0.12 | Tabular |
| Mid Cyan | 1.3 | 0.14 | Tabular |
| Slow Cyan | 0.96 | 0.11 | Tabular |
| Sample 4-1 | | | |
| Fast Yellow | 1.29 | ** | 3D |
| Mid Yellow | 2.49 | 0.12 | Tabular |
| Slow Yellow | 1.03 | 0.11 | Tabular |
| Fast Magenta | 2.11 | 0.125 | Tabular |
| Mid Magenta | 1.06 | 0.12 | Tabular |
| Slow Magenta | 0.66 | 0.12 | Tabular |
| Fast Cyan | 1.83 | 0.116 | Tabular |
| Mid Cyan | 1.26 | 0.108 | Tabular |
| Slow Cyan | 0.96 | 0.112 | Tabular |
| Sample 5-1 | | | |
| Fast Yellow | 1.18 | ** | 3D |
| Mid Yellow | 0.801 | ** | 3D |
| Slow Yellow | 0.689 | ** | 3D |
| Fast Magenta | 0.925 | ** | 3D |
| Mid Magenta | 0.606 | ** | 3D |
| Slow Magenta | 0.386 | ** | 3D |
| Fast Cyan | 0.931 | ** | 3D |
| Mid Cyan | 0.606 | ** | 3D |
| Slow Cyan | 0.385 | ** | 3D |
| Sample 6-1 | | | |
| Fast Yellow | 1.29 | ** | 3D |
| Mid Yellow | 2.49 | 0.12 | Tabular |
| Slow Yellow | 1.03 | 0.11 | Tabular |
| Fast Magenta | 2.11 | 0.125 | Tabular |
| Mid Magenta | 1.06 | 0.12 | Tabular |
| Slow Magenta | 0.66 | 0.12 | Tabular |
| Fast Cyan | 3.1 | 0.12 | Tabular |
| Mid Cyan | 1.3 | 0.14 | Tabular |
| Slow Cyan | 0.96 | 0.11 | Tabular |
| Sample 7-1 | | | |
| Fast Yellow | 1.29 | ** | 3D |
| Mid Yellow | 2.49 | 0.12 | Tabular |
| Slow Yellow | 1.03 | 0.11 | Tabular |
| Fast Magenta | 2.11 | 0.125 | Tabular |
| Mid Magenta | 1.06 | 0.12 | Tabular |
| Slow Magenta | 0.66 | 0.12 | Tabular |
| Fast Cyan | 2.7 | 0.11 | Tabular |
| Mid Cyan | 1.3 | 0.14 | Tabular |
| Slow Cyan | 0.96 | 0.11 | Tabular |

As discussed above, a film's sharpness as quantified by conventional Modulation Transfer Function values has been found to be an inadequate predictor of the films propensity to exhibit a fringe exposure problem. It has been found a film sample's tendency to exhibit the red fringing problem can be visually assessed by sensitometric exposure with a modified step chart tablet composed of two adjacent neutral density scales, one ranging from 0.0 to 3.0 neutral density and the other from 2.0 to 5.0 neutral density. Down the center of the 0.0 to 3.0 step scale is a thin (4 mm) opaque line; from this area of the tablet, direct exposure is completely eliminated, and only indirect exposure occurs. Sensitometric Tungsten light exposures (3200K) were made using the above tablet such that the 2.0 to 5.0 provides the characteristic D logE exposure curve for the film. Microscopic examination of the 0.0 to 3.0 density scale in the vicinity of the 4 mm line has been found particularly useful for detecting the fringe problem. Specifically, the area adjacent to the step in the DlogE curve corresponding to approximately base density +0.1 density red was examined for the presence of observable fringe. The results, along with conventional red Modulation Transfer Function (MTF) values measured at 60% input modulation at various frequencies are presented in Table 1 for several of the above described film samples. MTF values were obtained by exposing the samples using white light to sinusoidal patterns to determine the MTF Percent Response as a function of spatial frequency in the film plane. Specific details of this exposure-evaluation cycle can be found at R. L. Lamberts and F. C. Eisen, "A System for the Automated Evaluation of Modulation Transfer Functions of Photographic Materials", in the *Journal of Applied Photographic Engineering*, Vol. 6, pages 1–8, February 1980. A more general description of the determination and meaning of MTF Percent Response curves can be found in the articles cited within this reference. The exposed samples were developed generally according to the ECN-2 Process as described in the Kodak H-24 Manual, *Manual for Processing Eastman Motion Picture Films*.

TABLE 1

| Sample | Added red light absorbing compound | Red record % sens. (% decrease) | Fringe level | 2.5 c/mm | 5 c/mm | 50 c/mm | 80 c/mm |
|---|---|---|---|---|---|---|---|
| 6-2 | positioned dye 4 in layer 3 | 52 (−48) | very high | 1.027 | 0.974 | 0.322 | 0.17 |
| 4-4 | positioned dye 4 in layer 1 | 100 (0) | very high | 1.023 | 0.952 | 0.238 | 0.109 |
| 4-2 | distributed soluble dye 3 | 56 (−44) | absent | 1.029 | 0.995 | 0.281 | 0.139 |

TABLE 1-continued

| Sample | Added red light absorbing compound | Red record % sens. (% decrease) | Fringe level | 2.5 c/mm | 5 c/mm | 50 c/mm | 80 c/mm |
|---|---|---|---|---|---|---|---|
| 4-3 | distributed soluble dye 1 | 60 (−40) | very low | 1.034 | 0.973 | 0.27 | 0.131 |
| 6-1 | distributed soluble dye 1 | 57 (−43) | very low | 1.026 | 0.997 | 0.377 | 0.199 |
| 3-1 | distributed soluble dye 1 | 50 (−50) | absent | 1.057 | 1.035 | 0.383 | 0.187 |
| 7-1 | — | 100 | very high | 1.050 | 1.053 | 0.296 | 0.147 |
| 5-1 | — | 100 | low | 1.034 | 0.96 | 0.216 | 0.079 |
| 4-5 | — | 100 | very high | 1.024 | 0.946 | 0.24 | 0.128 |
| 1-1 | — | 100 | moderate | 1.036 | 0.96 | 0.392 | 0.224 |

In the above table, "Red record % sensitivity" refers to the sensitivity of the red record of the film sample relative to a comparable film sample without added red light absorbing compound. A reduction of one stop of speed is equivalent to −50% (i.e., a film with 50% sensitivity would require one extra stop of exposure (0.3 logE) to achieve a density of 0.2 above base density compared to a 100% sensitivity position). Green record and blue record sensitivities were reduced by less than 20% in each sample by the presence of any distributed blue light or green light absorbing compounds.

Sample 6-2 has a better red MTF than Sample 4-5 with no red fringe improvement. Surprisingly, Sample 5-1 has less of a red fringe than Sample 6-2, even though the latter has a higher red MTF. Sample 1-1 has a greater high frequency MTF than 6-1, but a slightly worse red record fringe position. Simply using a faster red layer does not lead to an improvement in the cyan fringe level as indicated by Sample 7-1.

Samples 4-2 and 6-1 illustrate that a distributed red absorber dye (either Dye 1 or Dye 3) at levels that reduce the inherent sensitivity of the red color record by 40% or more, is necessary to substantially reduce the cyan dye fringing problem. Sample 3-1 illustrates that the use of distributed dye at higher levels leads to further reduction of the cyan dye fringing problem. Samples 3-1 and 6-1 are also examples of photographic materials which comprise Tungsten speed balanced color records in accordance with preferred embodiments of the invention.

A more quantitative assessment of a films tendency to exhibit the red record fringe problem in digitized images can be obtained from computing the Spatial Frequency Response (SFR) of a digitally scanned film image. Film samples were subject to a contact exposure of an Air Force Tribar Resolution Chart (described in Military Standard 150-A paragraph 5.1.1.7, similar to the target shown in L. Stroebel, J. Compton, I. Current and R. Zakia, "Photographic Materials and Processes," Focal Press, Boston, 1986, p. 190). The test pattern consists of a sequence of equal density lines and squares that decrease in size. When exposed (contact) onto the film, the target pattern is superimposed on the film's base density plus fog (minimum density). The exposing conditions were adjusted such that the target image is at densities comparable to that obtained for a normally exposed 18% gray card. This effectively mimics the conditions encountered in blue screen, green screen, and black screen photography, where objects of normal or higher exposure are adjacent to areas of very low or no red exposure. The Spatial Frequency Response (SFR) of the scanned image was calculated using the edge of the largest square present in the Air Force target (see Reichenbach, S. E. et al., "Characterizing digital image acquisition devices," Optical Engineering, Vol. 30, No. 2, 1991, pp. 170–176.) The SFR measurement uses pixel values near slanted vertical edges. This allows the edge gradient to be measured at many phases relative to the pixel elements, in order to eliminate the effects of aliasing. The technique is mathematically equivalent to performing a moving knife edge measurement.

Film samples were taped to the drum of a Dainippon Screen DT-S1045AI Digital Color Drum Scanner such that the orientation of the target was 3–10 degrees (clockwise) off the vertical axis (a slanted edge is necessary to perform the SFR calculation). The scanner was operated at the following conditions: 1) film type: standard negative 2) highlight density 2.00; shadow density 0.10 3) resolution 8000 dpi 4) sharpness setting: off 5) aperture: 4 6) image format saved: 16 bit per channel, TIFF format for Macintosh. The images were down sampled to 24 bits (8-bits per color) prior to completing the SFR analysis. Code values are approximately linearly proportional to the density of the scanned images.

The spatial frequency response (SFR) was measured by analyzing the slanted edge of the largest square of the tribar target. A rectangle of 64 pixels wide by 256 pixels high was selected around the square edge. For each line of pixels perpendicular to the edge, the edge was differentiated using the discrete derivative "−0.5, X, +0.5", meaning that the derivative value for pixel 'X' is equal to −½ times the value of the pixel immediately to the left, plus ½ times the value of the pixel to the right. The centroid of this derivative was calculated to determine the position of the edge on each line. A best line fit to the centroids was then calculated. The number of lines used in the analysis was truncated to provide an equal number of lines at each phase of the edge position relative to the horizontal center of the pixel. This is done by keeping the largest integer number of phase rotations within the block, and deleting any remaining rows at the bottom of the block. The number of pixels per line was truncated so that only the pixels near the black to white edge are used in the analysis, in order to reduce the effects of noise. The one-dimensional supersampled line spread function is formed using the derivatives of the truncated two-dimensional image data. Using the first line as reference points, the data points from all the other lines were placed into one of four "bins" between these reference points, according to the distance from the edge for that particular line. This creates a single supersampled "composite" line spread function, having four times as many points along the line as the original image data. The line spread function was multiplied by a Hamming window, to reduce the effects of noise. The discrete Fourier Transform (DFT) of the windowed line spread function was calculated. The SFR is equal to the magnitude of the DFT of the line spread function. The SFR is given relative to the sampling frequency inherent in the image. The red and green image channels were analyzed independently.

It was found that the ratio of the red to green SFR values at approximately 0.05 cycles per sample (15 cycles per mm) correlate well with the extent of the red fringe phenomenon. The results of this measurement are summarized in Table 2.

TABLE 2

| Sample | Value SFR (at 0.05 c/sample) red:green | Visual Assessment of Fringe Level in processed Negative |
| --- | --- | --- |
| 4-1 | 0.48 | Very high |
| 2-1 | 0.51 | Very high |
| 1-1 | 0.57 | Moderate |
| 5-1 | 0.67 | Low |
| 6-1 | 0.73 | Very low |
| 3-1 | 0.89 | Absent |

Films that have acceptable red fringe levels are found to have FR ratios of red/green of at least 0.67 and preferably 0.89 or higher.

Additional samples similar to those above were prepared using distributed red light absorbing compounds Dye 5 and Dye 6 in place of distributed Dye 1 and Dye 3, and similar results were obtained.

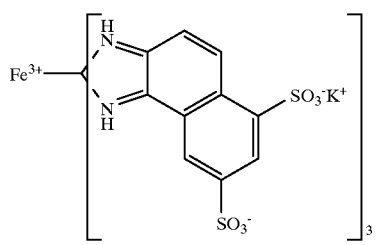

Dye 5

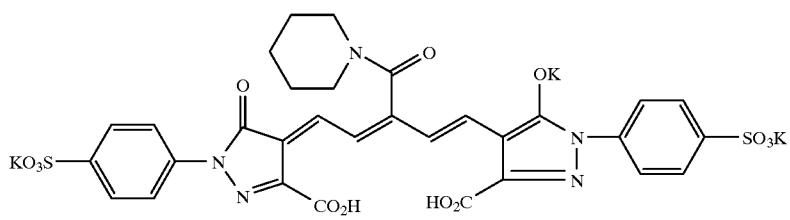

Dye 6

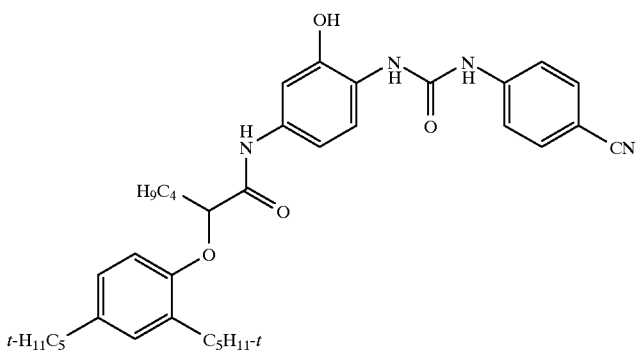

Coupler 1

Oxidized Coupler 2
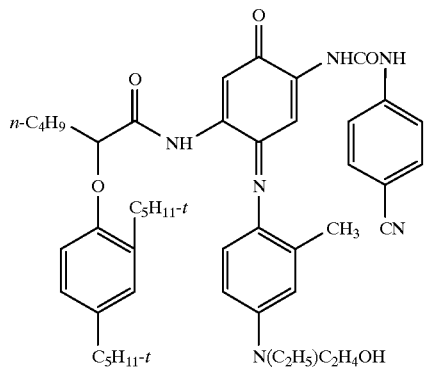
Coupler 3
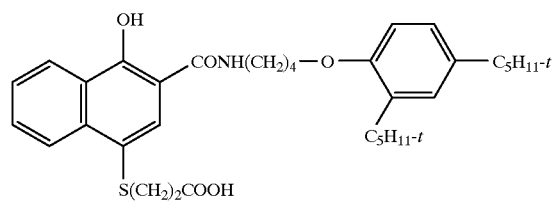
Coupler 4
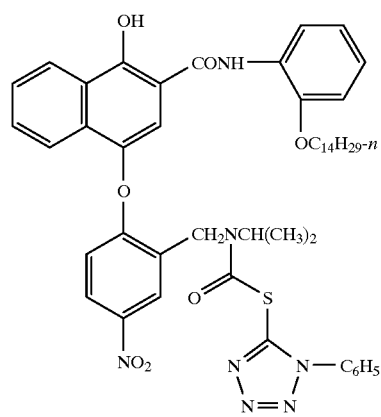
Coupler 5
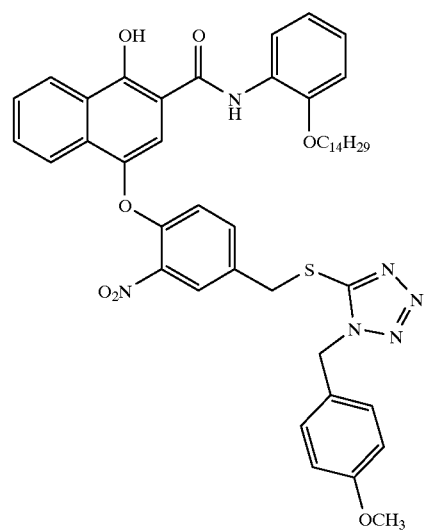

Coupler 6
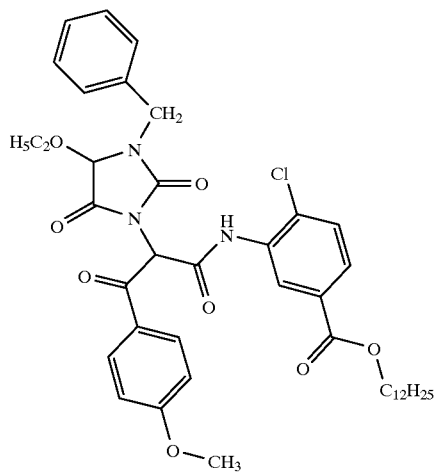
Coupler 7
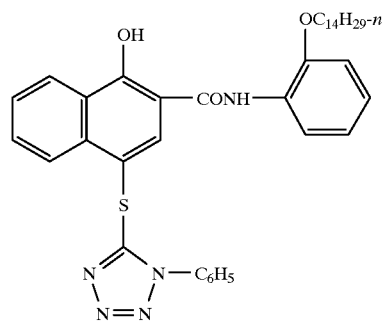
Coupler 8
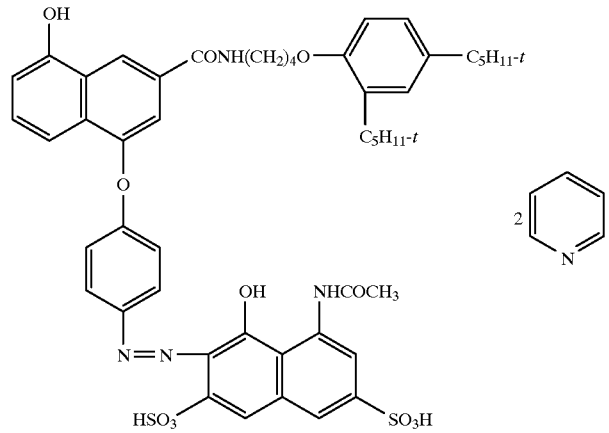
Coupler 9
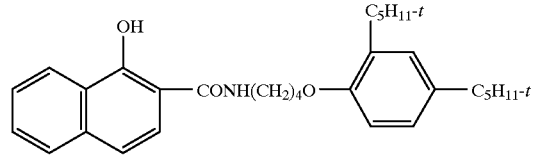

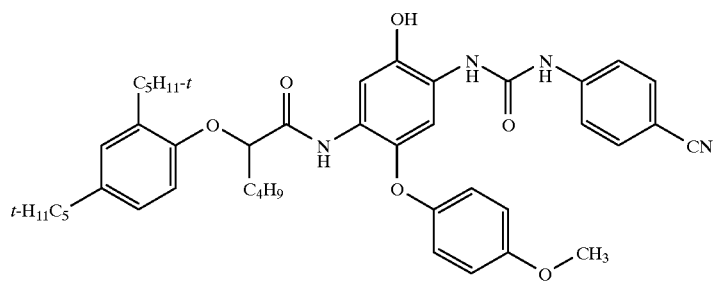
Coupler 10
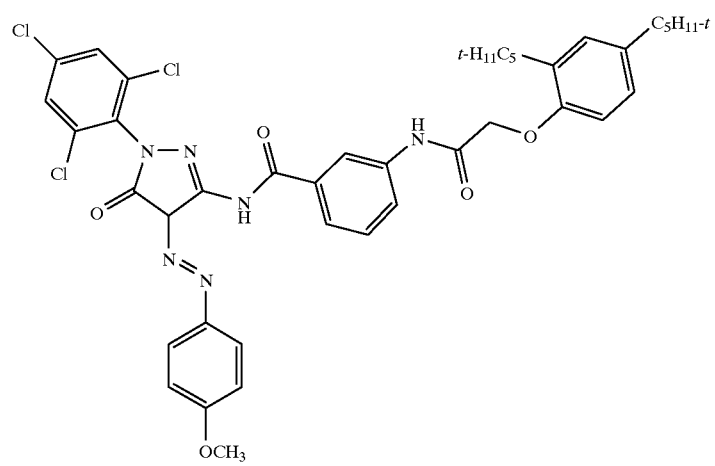
Coupler 11
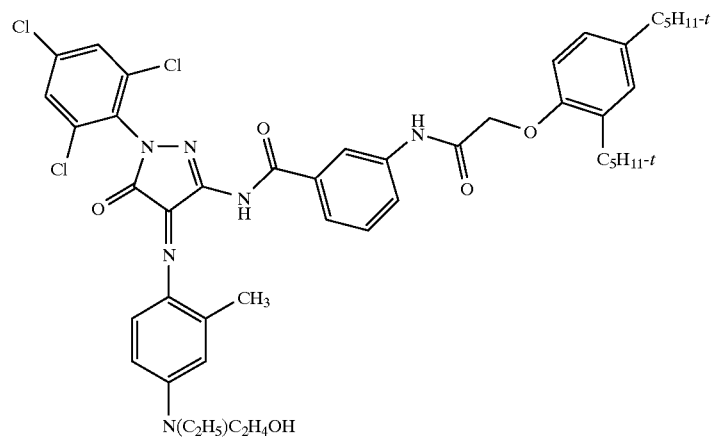
Oxidized Coupler 12
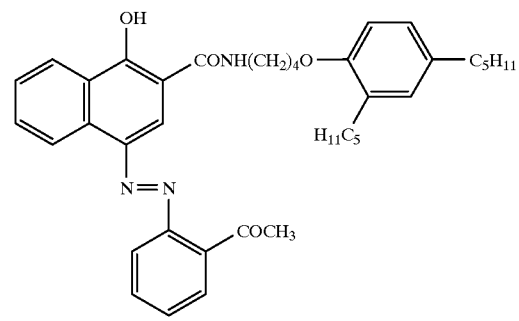
Coupler 13

-continued
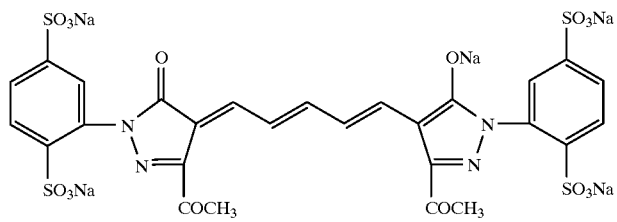
Dye 1
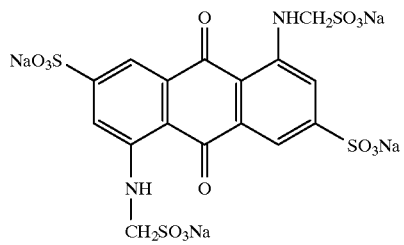
Dye 3
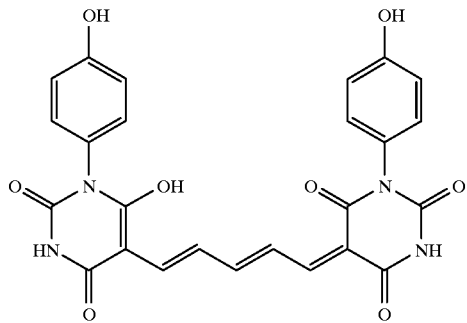
Dye 4
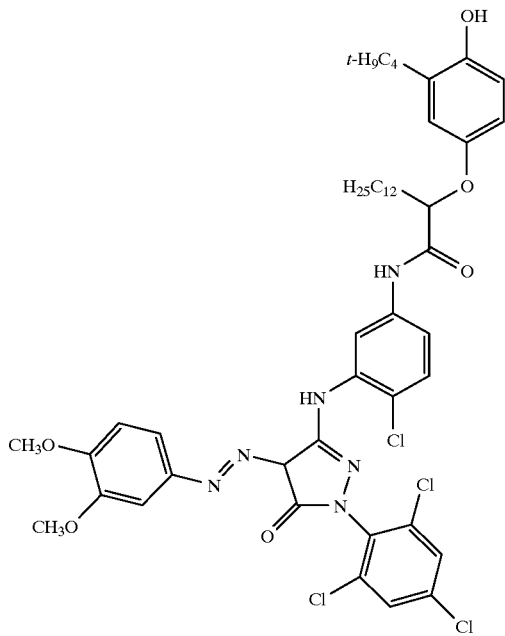
Coupler 14

-continued
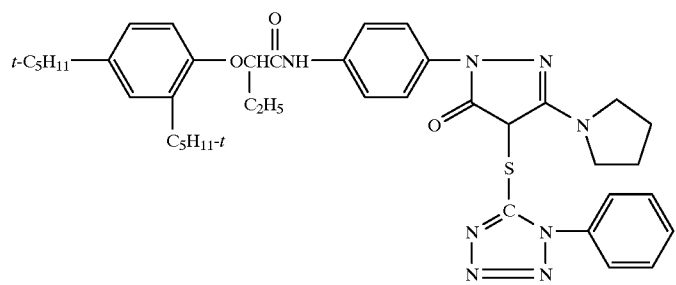
Coupler 15
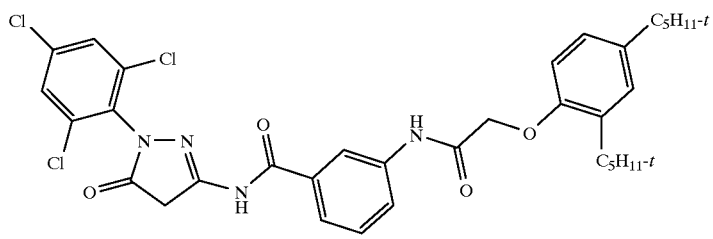
Coupler 16
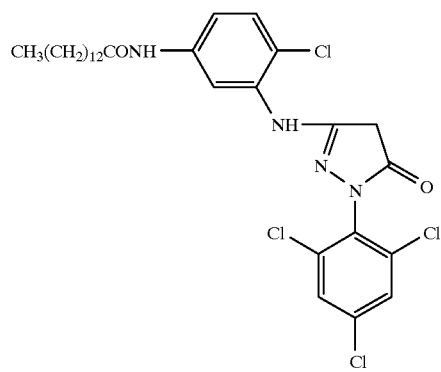
Coupler 17
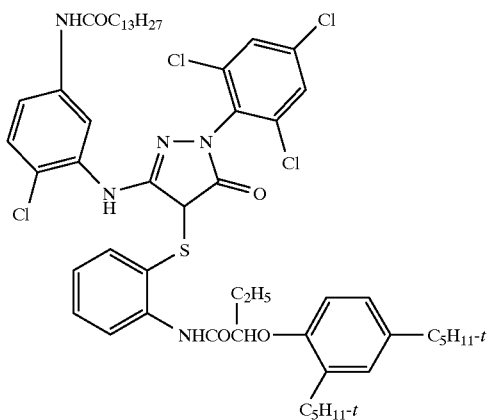
Coupler 18
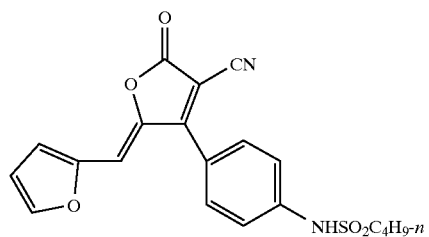
Dye 2

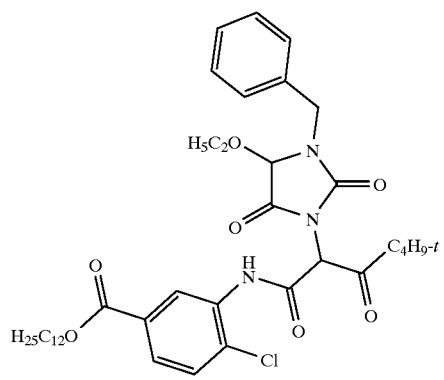
Coupler 19
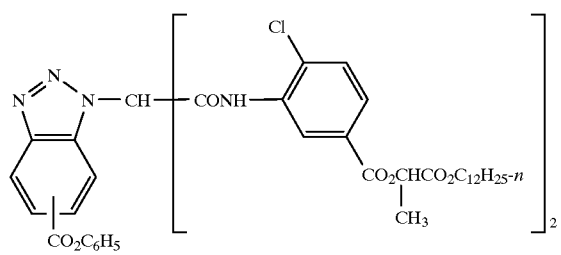
Coupler 20
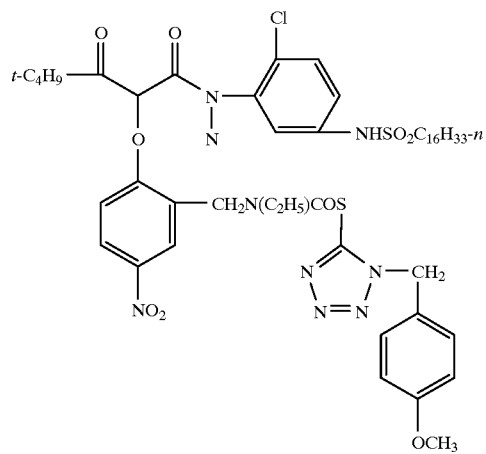
Coupler 21

-continued

Coupler 22

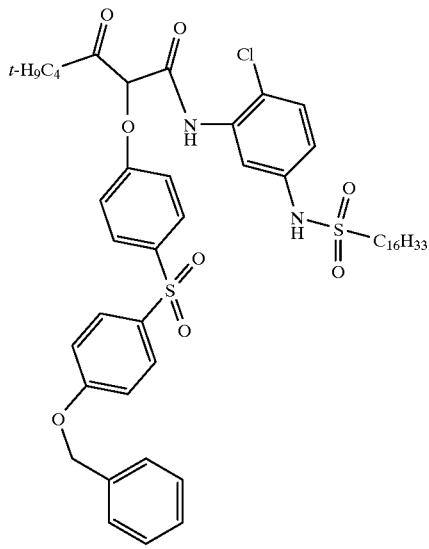

Coupler 23

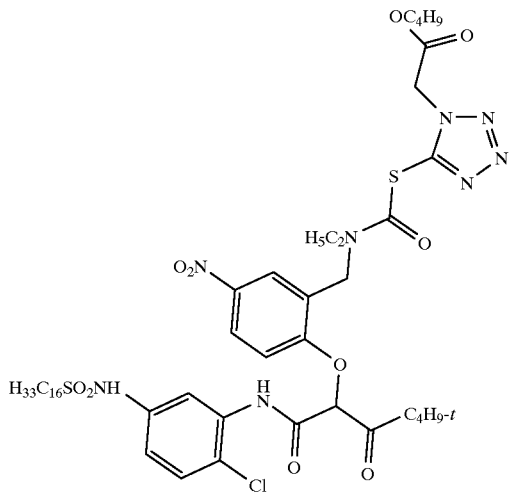

The invention has been described in detail with particular reference to preferred embodiments thereof, but it will be understood that variations and modifications can be effected within the spirit and scope of the invention.

We claim:

1. A speed balanced color negative photographic recording material comprising a support bearing:
   a red light sensitive color record comprising at least one red light sensitive silver halide emulsion and at least one cyan dye forming image coupler,
   a green light sensitive color record comprising at least one green light sensitive silver halide emulsion and at least one magenta dye forming image coupler,
   a blue light sensitive color record comprising at least one blue light sensitive silver halide emulsion and at least one yellow dye forming image dye forming coupler, and
   at least one distributed red light absorbing compound, wherein the quantity of distributed red light absorbing compound is such as to reduce the sensitivity of the red light sensitive color record by at least 40%, and the light sensitivities of the green light sensitive color record and the blue light sensitive color record are each reduced by less than 20% by the presence of any distributed green light absorbing compounds or blue light absorbing compounds.

2. A material as in claim 1, wherein at least one light sensitive layer of at least one color record comprises a sensitized tabular grain silver halide emulsion.

3. A material according to claim 2, wherein the tabular grain emulsion has an average aspect ratio greater than about 8.

4. A material according to claim 3, wherein at least one light sensitive layer of each of the red and the green color records comprises a sensitized tabular grain silver halide emulsion having an average aspect ratio greater than about 8.

5. A material according to claim 4, wherein the ratio of the average equivalent circular diameter of the largest tabular grain silver halide emulsion of the red color record comprising at least 10% of the total red record silver halide to the average circular diameter of the largest tabular grain silver halide emulsion of the green color record comprising at least 10% of the total green record silver halide is greater than or equal to 1.25.

6. A material according to claim 5, wherein the ratio is greater than 1.4.

7. A material according to claim 5, wherein the ratio is greater than 1.5.

8. A material according to claim 5, wherein the majority of the photographic light sensitive layers of the photographic material comprise sensitized tabular grain silver halide emulsions having average aspect ratios greater than about 8.

9. A material according to claim 5, wherein the sensitivities of the red, green and blue light sensitive color records are balanced for tungsten light exposures.

10. A material according to claim 5, wherein the sensitivities of the red, green and blue light sensitive color records are balanced for day light exposures.

11. A material according to claim 1, wherein the sensitivities of the red, green and blue light sensitive color records are balanced for tungsten light exposures or day light exposures.

12. A process of compositing two or more separate images comprising the steps of:

(a) imagewise exposing a color negative photographic recording material to a subject in front of a uniformly colored screen background, wherein the photographic recording material comprises a support bearing a red light sensitive color record comprising at least one red light sensitive silver halide emulsion and at least one cyan dye forming image coupler, a green light sensitive color record comprising at least one green light sensitive silver halide emulsion and at least one magenta dye forming image coupler, and a blue light sensitive color record comprising at least one blue light sensitive silver halide emulsion and at least one yellow dye forming image dye forming coupler, and further comprises at least one distributed red light absorbing compound, wherein the quantity of distributed red light absorbing compound is such as to reduce the sensitivity of the red light sensitive color record by at least 40%, and the light sensitivities of the green light sensitive color record and the blue light sensitive color record are each reduced by less than 20% by the presence of any distributed green light absorbing compounds or blue light absorbing compounds, (b) forming a color negative image of the subject and screen background by developing the exposed photographic material with a color developing agent, (c) separating the subject image of the color negative from the screen background image, and (d) compositing the separated subject image with a second image.

13. A process as in claim 12, wherein at least one light sensitive layer of at least one color record of the photographic material comprises a sensitized tabular grain silver halide emulsion.

14. A process according to claim 13, wherein the tabular grain emulsion has an average aspect ratio greater than about 8.

15. A process according to claim 14, wherein at least one light sensitive layer of each of the red and the green color records of the photographic material comprises a sensitized tabular grain silver halide emulsion having an average aspect ratio greater than about 8.

16. A process according to claim 15, wherein the ratio of the average equivalent circular diameter of the largest tabular grain silver halide emulsion of the red color record comprising at least 10% of the total red record silver halide to the average circular diameter of the largest tabular grain silver halide emulsion of the green color record comprising at least 10% of the total green record silver halide is greater than or equal to 1.25.

17. A process according to claim 16, wherein the ratio is greater than 1.4.

18. A process according to claim 16, wherein the ratio is greater than 1.5.

19. A process according to claim 16, wherein the majority of the photographic light sensitive layers of the photographic material comprise sensitized tabular grain silver halide emulsions having average aspect ratios greater than about 8.

20. A process according to claim 16, wherein the sensitivities of the red, green and blue light sensitive color records are balanced for tungsten light exposures.

21. A process according to claim 16, wherein the sensitivities of the red, green and blue light sensitive color records are balanced for day light exposures.

22. A process according to claim 12, wherein the uniformly colored screen background comprises a blue screen, green screen, or black screen background.

23. A process according to claim 22, wherein the uniformly colored screen background comprises a blue screen background.

24. A process according to claim 22, wherein the uniformly colored screen background comprises a green screen background.

25. A process according to claim 22, wherein the color negative image is digitized with a film scanner and the subject image of the color negative is separated from the screen background image with software algorithms.

* * * * *